(12) United States Patent
Pfeffer et al.

(10) Patent No.: US 8,688,595 B2
(45) Date of Patent: *Apr. 1, 2014

(54) ANALYZING TRANSACTIONAL DATA

(75) Inventors: Elery Pfeffer, Tel-Aviv (IL); Guy Gildor, Hertzelia (IL)

(73) Assignee: Pursway Ltd., Herzliya (IL)

( * ) Notice: Subject to any disclaimer, the term of this patent is extended or adjusted under 35 U.S.C. 154(b) by 1557 days.

This patent is subject to a terminal disclaimer.

(21) Appl. No.: 12/078,352

(22) Filed: Mar. 31, 2008

(65) Prior Publication Data

US 2009/0248434 A1      Oct. 1, 2009

(51) Int. Cl.
  *G06Q 10/00*      (2012.01)
(52) U.S. Cl.
  USPC ........................................................ 705/320
(58) Field of Classification Search
  None
  See application file for complete search history.

(56) References Cited

U.S. PATENT DOCUMENTS

| | | | |
|---|---|---|---|
| 7,503,070 B1 * | 3/2009 | Alstyne et al. ................. | 726/22 |
| 7,510,308 B2 | 3/2009 | Goto | |
| 2002/0062368 A1 | 5/2002 | Holtzman et al. | |
| 2004/0088325 A1 | 5/2004 | Elder et al. | |
| 2005/0267766 A1 | 12/2005 | Galbreath et al. | |
| 2006/0143081 A1 | 6/2006 | Argaiz | |
| 2006/0270421 A1 | 11/2006 | Phillips | |
| 2007/0281689 A1 | 12/2007 | Altman | |
| 2008/0040474 A1 | 2/2008 | Zuckerberg et al. | |
| 2008/0140506 A1 * | 6/2008 | Christianson et al. .......... | 705/10 |
| 2008/0154915 A1 | 6/2008 | Flake | |
| 2008/0189274 A1 | 8/2008 | Mann | |
| 2008/0255946 A1 | 10/2008 | Altberg | |
| 2008/0318529 A1 | 12/2008 | Harb | |
| 2009/0006206 A1 | 1/2009 | Groe | |
| 2009/0070228 A1 | 3/2009 | Ronen | |
| 2009/0083418 A1 | 3/2009 | Krishnamurthy | |

FOREIGN PATENT DOCUMENTS

| | | | |
|---|---|---|---|
| JP | 2002108930 A | 4/2002 | |
| JP | 2004240640 A | 8/2004 | |
| JP | 2007004504 A | 1/2007 | |

(Continued)

OTHER PUBLICATIONS

Communication from the Europen Patent Office in corresponding European Application No. 097283709 Dated May 6, 2011.

(Continued)

*Primary Examiner* — Jami A Plucinski
*Assistant Examiner* — Shaun Sensenig
(74) *Attorney, Agent, or Firm* — Graeser Associates International Inc; Dvorah Graeser

(57) ABSTRACT

A system and method for measuring or at least detecting the effect of at least implicit communication on transactions within a social group, optionally such as consumer purchases for example. The group may optionally comprise a social network, a pair, 3 or more individuals and so forth. By "implicit communication" it is meant communication for which there is no record, for example in a database. The aftereffects of such communication may optionally be determined, detected and/or measured through detection and/or measurement of influence, as described in greater detail below. For example, if a first consumer performs purchase of an item and a second consumer later purchases the same or similar item within a given time period, the two purchases may optionally be linked through influence which may in turn have optionally occurred through implicit communication. Optionally, the system and method may also measure or at least detect the effect of explicit communication, for which there is a record, for example in a database that describes the communication itself.

17 Claims, 5 Drawing Sheets

(56) References Cited

FOREIGN PATENT DOCUMENTS

| WO | WO0068860 A2 | 11/2000 |
|---|---|---|
| WO | 2006040405 A1 | 4/2006 |
| WO | 2007082274 A2 | 7/2007 |
| WO | WO 2007/082274 | 7/2007 |
| WO | 2007109721 A2 | 9/2007 |
| WO | 2007109726 A2 | 9/2007 |
| WO | WO2007130918 A2 | 11/2007 |
| WO | WO 2008/068716 | 6/2008 |

OTHER PUBLICATIONS

International search report and written opinion for corresponding PCT/IL2009/000376 dated Apr. 5, 2009.
Chinese office action for corresponding Chinese application, mailed Oct. 24, 2012.
European office action for corresponding European application (divisional), mailed Jul. 16, 2012.
OA for CN 200980111162.X mailed May 2, 2013.
OA for JP 2011-501340 mailed May 14, 2013.

* cited by examiner

ANALYZING TRANSACTIONAL DATA

FIELD OF THE INVENTION

The present invention is of a system and method for analyzing transactional data, and in particular, for such a system and method in which implicit communication may be determined and included in the analysis.

BACKGROUND OF THE INVENTION

Successful marketing of products (including goods and/or services) relies upon many factors; however, a predominant factor is word of mouth, or the effect of interpersonal communication. Word of mouth marketing relies upon the recommendation or opinion of a trusted colleague, friends, or relatives of the consumer. Word of mouth marketing is effective yet is difficult for merchants and brand owners to successfully perform.

Various attempts have been made to determine consumer social networks, and hence to promote or influence word of mouth marketing through particularly influential members of such networks. However, these attempts have generally not been successful, despite (or rather because of) the massive amount of available data. Thus, merchants frequently attempt instead to analyze and predict the behavior of each consumer individually, and hence disregard such connections.

There are many efforts organizations employ to use the power of word of mouth.

Undercover marketing—commercially motivate people to recommend a certain product (personally or through internet chat rooms, talkbacks etc.) or use the product or service in public.

Creating buzz—Certain companies use word of mouth advertising agencies to identify opinion leaders and use them to spread word of mouth.

These opinion leaders are recruited one by one through web site or personal interviews.

Targeting trend setters—Certain companies send a product to several A-list trend setters to spread the word. For example, the book "the da Vinci code" was sent to 10,000 industry trend setters for them to create and amplify the word of mouth around the book.

Thus, none of the above attempted solutions successfully uses social networks to determine how to target word of mouth marketing to influential members of such networks.

SUMMARY OF THE INVENTION

The background art does not teach or suggest a system or method for successfully determining a social network from transactional or other data. The background art also does not teach or suggest such a system or method which incorporates implicit communication.

The present invention overcomes these drawbacks of the background art by providing a system and method for measuring or at least detecting the effect of at least implicit communication on transactions within a social group, optionally such as consumer purchases for example. The group may optionally comprise a social network, a pair, 3 or more individuals and so forth. By "implicit communication" it is meant communication for which there is no record, for example in a database. However, implicit communication is preferably detected according to an action and/or an effect of an action, such as a transaction for example, which more preferably features some type of recorded data. The aftereffects of such communication may optionally be determined, detected and/or measured through detection and/or measurement of influence, as described in greater detail below. For example, if a first consumer purchases an item and a second consumer later purchases the same or similar item within a given time period, the two purchases may optionally be linked through influence which may in turn have optionally occurred through implicit communication.

Optionally, the system and method may also measure or at least detect the effect of explicit communication, for which there is a record, for example in a database that describes the communication itself. Non-limiting examples include a telephone call record or an email record. However, it is difficult to determine influence through explicit communication alone and in fact the present invention does not relate to determining influence through such explicit communication alone.

Alternatively or additionally, according to some embodiments, a key member of a social group is preferably identified and the relationship(s) between the key member and other member(s) of the social group are determined, more preferably including influence(s) by the key member on other member(s) of the social group and also optionally including influence(s) by other member(s) of the social group on the key member. Optionally the complete social network is not determined for this embodiment.

Influence may optionally be active or passive. Active influence occurs when an individual speaks about a product directly, for example to recommend it, preferably without any commercial incentive. Passive influence occurs through indirect transfer of information between individuals, for example by viewing a product purchased by an individual. Preferably both types are determined and/or measured according to the present invention.

The passive influence is preferably measured or quantified, thereby resulting in the quantification of a passive transmission coefficient. More preferably, active influence is also measured or quantified, thereby resulting in the quantification of an active transmission coefficient.

Preferably, the behavior of the social group is analyzed to form a social network. Such analysis preferably includes determining a relationship between two or more consumers; and preferably analyzing passive and/or active influence(s) between them. Most preferably, at least implicit communication is measured although optionally and most preferably, direct communication is measured.

According to some embodiments, person to person interactions are preferably mathematically modeled. The model derivatives may optionally then be used for implementing some type of action plan. Preferably such person to person interactions are analyzed according to at least implicit communication; optionally such interactions are also analyzed according to direct or explicit communication. Optionally and preferably, such a person is a consumer, in which case the model derivatives may optionally be used to implement a marketing action plan.

According to other embodiments, a plurality of social networks is constructed. Next a selection of at least two of the plurality of social networks is combined according to a threshold of similarity, to form a combined social network.

According to some embodiments, relationships between customers are detected by clustering a plurality of purchases according to time as well as according to a similarity threshold for the at least one product purchased, and then overlaying these clusters to determine at least one relationship.

The term "up-sell" refers for example to increasing the purchase size during the purchasing process by increasing the price of the product purchased (or basket thereof), for example by inducing the consumer to buy a more expensive product. The term "cross-sell" refers to inducing the consumer to buy another, additional product, in addition to the product(s) originally requested for purchase.

As used herein, the term "product" may optionally refer to one or more goods and/or services.

Although the present invention is described with regard to a "computer" on a "computer network", it should be noted that optionally any device featuring a data processor and/or the ability to execute one or more instructions may be described as a computer, including but not limited to a PC (personal computer), a server, a minicomputer, a cellular telephone, a smart phone, a PDA (personal data assistant), a pager. Any two or more of such devices in communication with each other, and/or any computer in communication with any other computer may optionally comprise a "computer network".

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or stages manually, automatically, or a combination thereof. Moreover, according to actual instrumentation and equipment of preferred embodiments of the method and system of the present invention, several selected stages could be implemented by hardware or by software on any operating system of any firmware or a combination thereof. For example, as hardware, selected stages of the invention could be implemented as a chip or a circuit. As software, selected stages of the invention could be implemented as a plurality of software instructions being executed by a computer using any suitable operating system. In any case, selected stages of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION OF PREFERRED EMBODIMENTS

Figure 1:
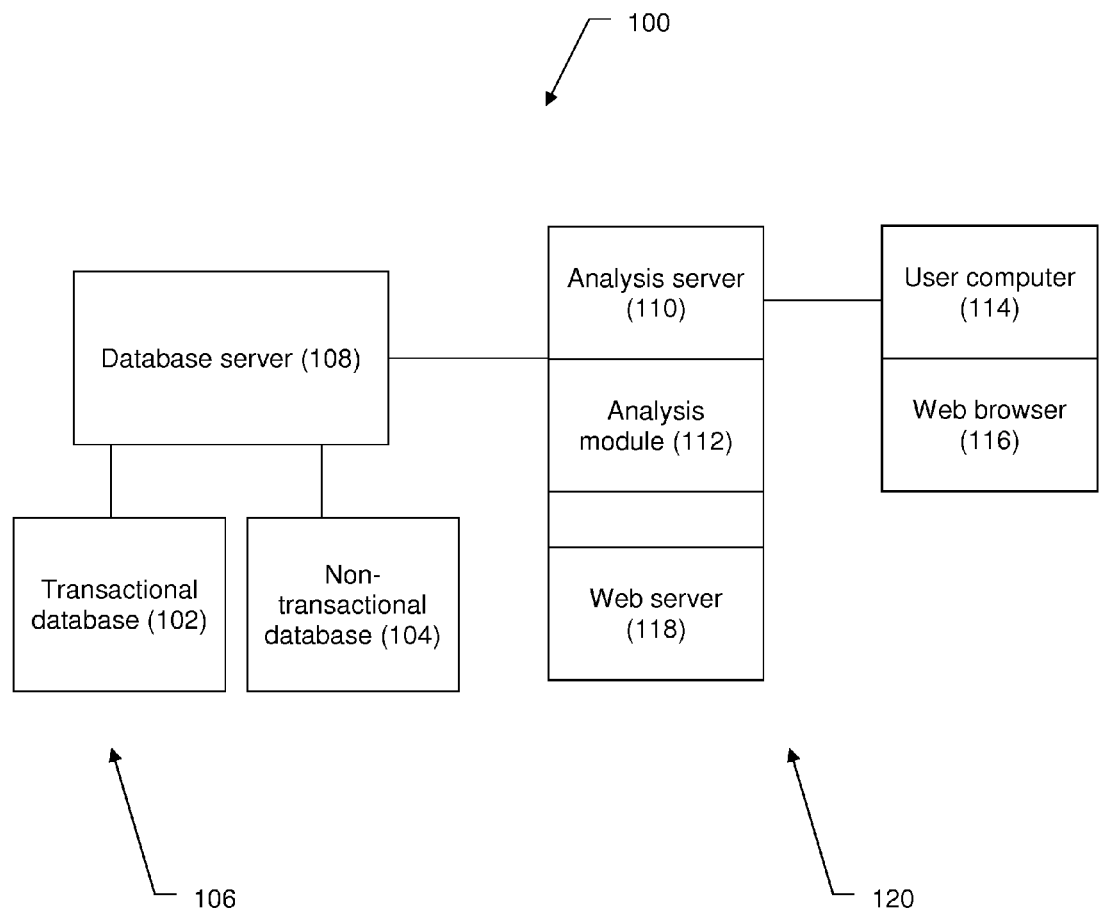
FIG. 1 is a schematic drawing of an exemplary, illustrative system according to the present invention.

The present invention is of a system and method for measuring or at least detecting the effect of at least implicit communication within a social group. Optionally also explicit communication is detected and used, but this is not necessary.

Such communication is preferably analyzed to determine influence of an individual on one or more other individuals and/or to determine how such an individual is influenced in turn by one or more other individuals, preferably within a social group, optionally and more preferably in the context of a social network. Influence may optionally be active or passive. The passive influence is preferably measured to determine a passive transmission coefficient. More preferably, active influence is also preferably measured to determine an active transmission coefficient.

With regard to implicit communication, preferably indirect methods are used to detect such influence. In other words, rather than directly interrogating an individual regarding communication with one or more other individuals, preferably the behavior of the individuals is analyzed. According to preferred embodiments of the present invention, behavior of the individuals is analyzed at least with regard to one or more commercial transactions, for example purchasing one or more products. Optionally and more preferably, commercial transactions are analyzed to detect implicit communication, and most preferably influence of at least one individual on at least one other individual.

Such commercial transactions may optionally be analyzed in order to filter the data. Preferably, such analysis includes limiting potentially influencing commercial transactions to those which occur within a specified time period. The time period is preferably determined according to one or more of the following parameters: desired time period for a commercial entity, length of decision cycle, expense of product being purchased, durability of product being purchased and so forth. The desired time period for a commercial entity may optionally be determined by the entity according to any factor(s) of interest. For example the commercial entity may optionally only be interested in monthly sales and changes in such sales, in which case the desired time period involves transactions within a month or less of each other.

The length of the decision cycle depends upon many factors for a particular product as is well known in the art. For example, a product that a parent purchases for a child may have a longer decision cycle than a similar product bought for the parent or for another adult, given the emotional importance of purchasing the "best" product for the child for the parent. A summer vacation may optionally be planned on a yearly basis, given the seasonality of such a product. Increased relative expense or perceived permanence of the product may also increase the decision cycle, while lower relative expense or perceived impermanence of the product may decrease the decision cycle.

Absolute expense is clearly an important factor, as individuals typically will increase the decision cycle for products that are absolutely expensive for them, such as a house or automobile, which may require one or more years for a decision to be reached for example. Durability is also important; a blouse which may only be worn for a few months is more likely to be the subject of a short decision cycle than a bread toaster for example, even if similar levels of expense are involved.

Another illustrative type of filter which may optionally be applied involves selection for multiple (ie a plurality) of transactions occurring within the selected time period, representing purchases done simultaneously by different individuals. As the number of corresponding transactions increases, the likelihood of a relationship also increases as does the likelihood of at least implicit communication and also of influence, whether active or passive.

Yet another illustrative type of filter which may optionally be applied involves selection for transactions within a geographically delimited area. Although influence is possible over a greater distance, passive influence in particular is more likely to be increased by proximity. The geographically delimited area may optionally comprise one or more of a particular region, city or town, shopping center or other building, street or other address, specific store and so forth.

Transactions tied to particular events, such as birthdays, or transactions which are gifts, may also optionally be filtered according to the present invention, as such transactions are more likely to have some type of correlation.

Of course the above description could optionally be adapted for any type of transaction or other event or action.

According to some embodiments, the filtered data is then clustered or otherwise analyzed in order to uncover one or more relationships between individuals. For example, if the relationships are displayed in a social network graph, then the individuals are the nodes and the relationships between them are indicated by edges. Non-limiting examples of suitable algorithms for performing such clustering and/or other types of analysis include genetic algorithms combined with fuzzy logic, as well many known graphical analysis algorithms, such as dominating set, graph morphology, and so forth.

According to preferred embodiments of the present invention, the data (whether filtered or not) is analyzed according to iterative clustering. Iterative clustering is preferably used to combine available relationship information with commercial transactional information or other transactional information as described herein. As its name suggest, the method is preferably performed more than once, more preferably in order to determine at least one social network with described influences in the relationships between individuals, most preferably including determining of a key member of the network who is most influential.

Overall, in some embodiments, the present invention is preferably able to align marketing strategy and budget with the actual process by which consumers make purchasing decisions.

Turning now to the drawings, FIG. 1 shows an exemplary system according to the present invention with regard to the specific example of commercial transactions, but also optionally including non-commercial transactional data. As shown, a system 100 preferably features a transactional database 102 of transactional information and a personal database 104 containing non-transactional information. Non-limiting examples of transactional information preferably include information made regarding purchases of products. Non-limiting examples of non-transactional information preferably include evidence of direct communication (for example by telephone or email); shared background such as schools or universities attended; and any current shared life aspects such as shared address, near neighbors (for example on the same street or within a delimited geographical area), shared workplace and so forth.

Databases 102 and 104 may optionally be located at a merchant 106 as shown, such that the information contained therein is collected by merchant 106 and may optionally be served through a database server 108. Optionally data may be available from several merchants 106 (not shown) or from open data sources (such as data from the internet) (not shown).

An analysis server 110 is preferably in communication with databases 102 and 104 through database server 108. Analysis server 110 preferably comprises an analysis module 112 for performing one or more of the analysis methods described herein with regard to at least the transactional data of transactional database 102, although optionally also with regard to the non-transactional data of non-transactional database 104. Analysis server 110 is shown as being in communication with a user computer 114, which optionally features a web browser 116 as a non-limiting, illustrative example the GUI (graphical user interface) for interacting with analysis module 112 and also for optionally and preferably viewing reports, modifying, adding or removing analysis parameters and so forth. Analysis server 110 may also optionally send report data and/or other types of data to be stored in a database, for example through database server 108. Analysis server 110 preferably includes a web server 118 for supporting communication with web browser 116, for example for displaying reports and other data to the user, and/or for receiving one or more commands from the user, for example.

Database server 108, analysis server 110 and user computer 114 are all optionally in communication through a network 120 as shown, which may for example optionally be the Internet. System 100 is an illustrative example of an implementation of a system which may optionally be used for performing any of the methods described herein. Even if not explicitly described, it is assumed that any of methods described herein may optionally include one or more interactions with the above system 100, for example for performing the method on a computer and optionally and preferably displaying the result to the user. The term "display" optionally includes outputting data, a report or any other information described herein to at least one of a computer readable memory, a computer display device, a computer on a network, a printer, a cellular telephone or any other device described herein as a computer, any type of messaging system (including but not limited to email, SMS (short message service) messages or other cellular telephone messages, IM (instant messages), posting to a web site and so forth) or a user, as is known in the art.

Figure 2:
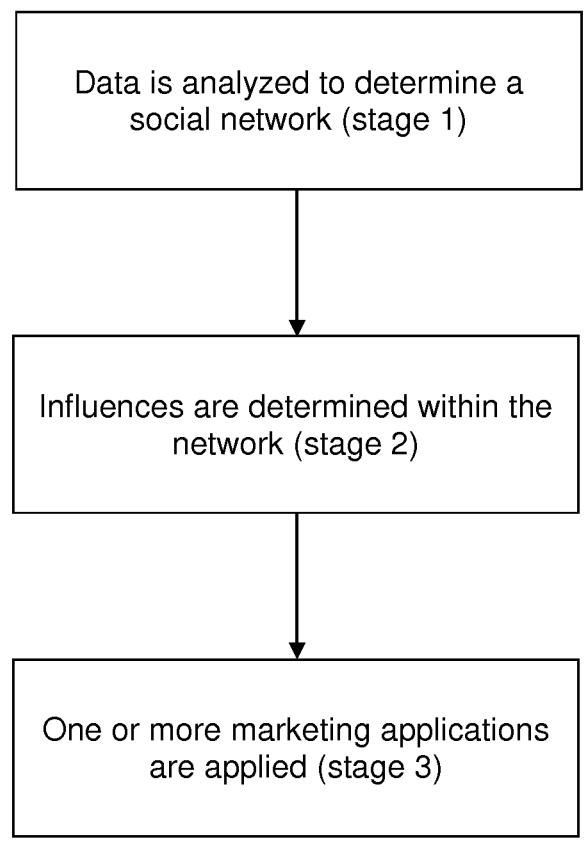
FIG. 2 is a flowchart of an exemplary, illustrative method for word of mouth marketing according to the present invention.

FIG. 2 shows a flowchart of an exemplary method for promoting word of mouth marketing according to the present invention.

In stage 1, optionally data is analyzed to determine a social network. As described in greater detail below, the data optionally and preferably includes relationship data and also transactional data. More preferably the data is analyzed according to iterative clustering. Optionally, static data (for example including but not limited to co-attendance at a school or university or military unit, being co-workers in the past or present and so forth) is analyzed to form the social network. Optionally and preferably, the static data is analyzed first, followed by other types of data.

In stage 2, preferably the influence of each member of the network on each other member is determined and is more preferably measured, as described in greater detail below. Such influence preferably relates to the transactional data in order to determine how each member of the network influences the purchases of one or more other members of the network.

In stage 3, such influences are optionally and preferably used in one or more marketing applications as described in greater detail below, for example in order to direct marketing efforts particularly to key members of the social network, who have greater influence on other members of the network.

Figure 3:
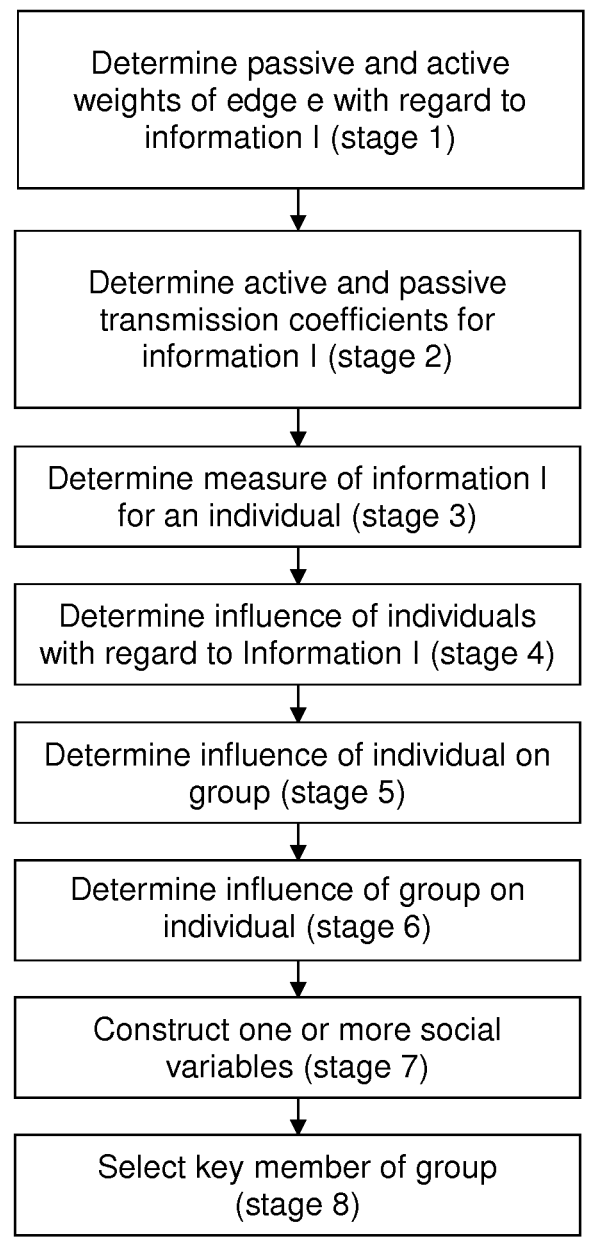
FIG. 3 is a flowchart of an exemplary, illustrative method for determining influence of individuals having relationships according to the present invention.

FIG. 3 shows a flowchart of an exemplary method for determining an influence mathematical model to describe the influence a person exerts and is under from that person's social network model according to the present invention. For the purpose of description only and without any intention of being limiting, the following parameters are described.

Let G=(V,E) be a directed graph describing a social network.

Where

V—A set of individuals in a society.

E—A set of directed weighted edges, each directed edge $(v,u)=e \in E$ represents individual u who knows v or that it is influenced by v.

Let I denote the information (or opinion or perception) that spreads in the social network. The information is optionally limited to a particular category, for example according to a particular type of product being purchased. The information preferably relates to implicit communication as described herein.

As shown, in stage 1, for each $e \in E$ and each I, let $w_e^{Ip}$, and $w_e^{Ia}$ denote the passive and active weights of edge e respectively with regard to information I, in which $w_e^{Ip}, w_e^{Ia} \in R$.

The weight on the edges represents the level of influence a person v has on person u with regards to information I. Passive influence is denoted by a p superscript. Passive influence quantifies or indicates the level in which information transferred from person A to person B without verbal communication simply by meeting, for example, when two people meet they observe each other's clothing.

Similarly, active influence is denoted by an a superscript. This quantifies the level in which two people exchange information in a direct or intentional manner, for example a shows b his new webcam or talks about investing opportunities.

Note: these weights implicitly encompass the use, opinion and regard person v has of information I.

In stage 2, let $c_I^a$, $c_I^P \in R$ denote active and passive transmission coefficients for information I. These coefficients quantify the level that certain information is communicated (either actively or passively) between two individuals. For example, the passive communication factor of a shirt is higher than that of a video camera.

In stage 3, let $w_v^I \in R$ denote the measure of information I within a person v.

In stage 4, the influence a person v has on person u with regards to information I can be described as:

$$f_{vu}^I = w_e^{Ip} \times c_I^P + w_e^{Ia} \times c_I^a$$

where $e=(v,u) \in E$

In stage 5, preferably the influence on the social group by a person "v" is defined as according to the following function, which is a function on a set:

$$f_{\pi(V)}^I = F(\{f_{VU_i}^I \mid U_i \in \pi(V)\})$$

In stage 6, optionally and preferably the influence of the social group on the person v is defined as:

$$f_{\pi^{-1}(V)}^I = F(\{f_{VU_i}^I \mid U_i \in \pi^{-1}(V)\})$$

In stage 7, the results from stages 5 and 6 are optionally and preferably used to construct one or more social variables for one or more members of the social group. The social variables preferably include the above described influences on the group and influences by the group. Optionally the group may be divided into one or more subgroups for such an analysis. The social variables are preferably determined separately for each category or type of information I. The social variables also optionally and preferably include likelihood of churn and other decision cycle processes.

In stage 8, the results from at least stage 5 (but preferably also stage 6 and optionally also stage 7) are preferably used to select a key member of a social group, who has a greater effect on other member(s) of the social group than any other member. Optionally and more preferably, the key member also has more influence on the other member(s) of the group than the level of influence on the key member by the other member(s) of the group.

Optionally a key member may be designated as a connector, by having at least X members being influenced (ie a number of influenced members above a threshold number, which may optionally be the maximum number). The connector may then preferably be selected, for example for a marketing campaign.

Some non-limiting examples of different types of key members and their influence on their social group include the following.

For example, a key member may optionally be a celebrity; under this model, a celebrity is a person with a very large network neighborhood, i.e. he or she is known by a great many people, and for most edges e that represent an influence between the celebrity to another person, the values of $w_e^P, w_e^a$ are low since the celebrity is perceived to be commercially motivated to spread information and/or commercial influence and is therefore considered to be less reliable as a source of information and/or recommendation. The effectiveness of celebrity marketing stems from the number of people who are influenced by him or her.

An undercover marketing person has a small network neighborhood (ie social group), but $w_e^P, w_e^a$ for his/her neighbors are higher than that of a celebrity since he/she is perceived to be unbiased (whether true or not).

Another type of key member is an opinion leader, who is a person with a normal size network neighborhood (10-50 firsthand friends) where $w_e^P, w_e^a$ for his/her neighbors are very high since they are perceived to be both unbiased and uninfluenced. The opinion leader may actually only be a leader for a particular type of information.

A key member who is an expert has a large size network neighborhood where the values of $w_e^P, w_e^a$ for his/her neighbors are very high since they are perceived as very knowledgeable, but with regard to specific information I only.

Optionally, a preferred mode of influence from active or passive is selected for a marketing campaign for example according to the strength of the relationship, more preferably with regard to a particular category of information. For example clothes are very visual and hence as far as fashion is concerned, one may optionally influence individuals even without a strong relationship between them. An example may optionally include a large social group being influenced by an individual, even weakly; for fashion, such a situation may optionally be preferred to a small social group with strong influence.

As a general example (without regard to a particular member type), the above model demonstrates that viral marketing campaigns are effective only when the information transition coefficients are larger than 1, such that each time a new person is "infected" with information, this person causes more than one person to be so "infected" as well.

Some non-limiting, illustrative examples of applications involving key members are as follows: surveying opinion leaders as a separate group to make value offering more in tune with their needs (and hence to influence their followers); targeting opinion leaders as a way to reach the entire market; timing and/or otherwise arranging marketing campaigns to increase existing word of mouth (for example, first target opinion leaders, then after a time their followers, then the followers of these followers and so forth).

Another exemplary, non-limiting, illustrative example of an application with a key member and one or more influenced members is to detect and/or determine when the key member has implicitly communicated information to the one or more influenced members, and then to contact the latter to further influence their selection and/or actions, for example to influence them to make a purchase. Optionally and preferably, the marketing campaign may be constructed to first directly attempt to influence a key member, for example with a coupon or special deal, such that the probability of communication increases between the key member and the one or more influenced members.

If a plurality of key members is available for such a campaign, then optionally and preferably one or more key members who are part of the same social network and/or who share more of the same overlapping social group are selected in order to maximize influence on a selected group of influenced members.

Also optionally a social network may be divided into a plurality of smaller sub-networks (micro social segments), after which a marketing campaign is then directed to one or more selected sub-networks, for example in order to achieve a desired level of saturation in that part of the market as a whole and so forth. Also, this method permits the development and management of a marketing campaign from a social development perspective, for example by selecting certain sub-networks to initiate a campaign and then propagating the campaign throughout the network.

Figure 4:
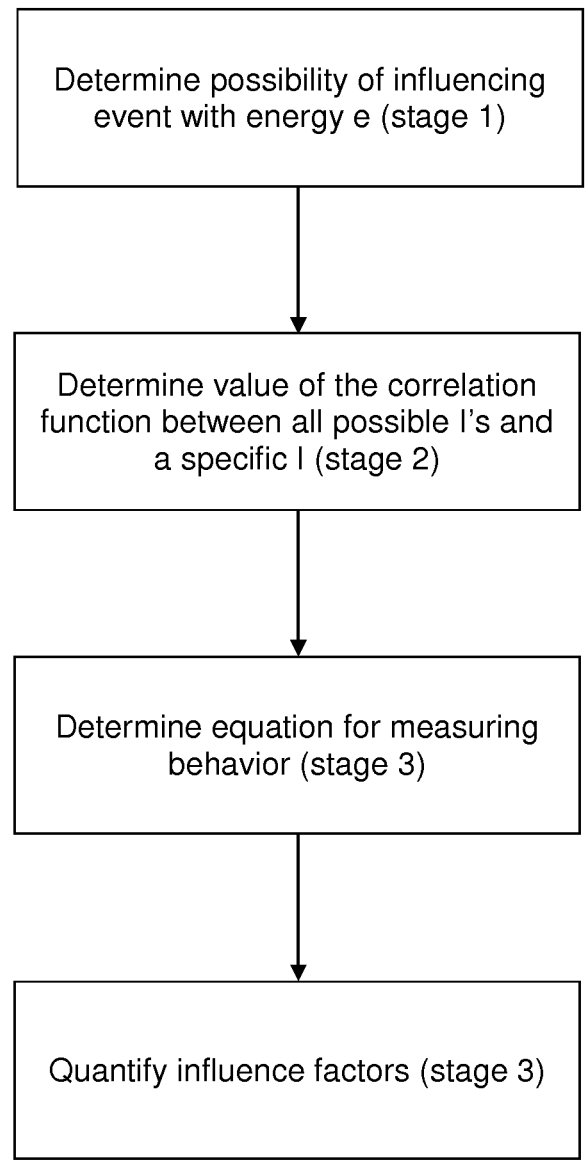
FIG. 4 is a flowchart of an exemplary, illustrative method for quantifying influence factors according to the present invention.

FIG. 4 is of an exemplary, illustrative method for applying the model constructed according to FIG. 3, for example, for each member v and information I, measuring $f_\pi^I(v)$ and $f_{\pi^{-1}}^I(v)$, or in other words, try to measure how much a member is influencing and is influenced by his social environment with regards to certain information or opinion I. Overall, this method involves analyzing the transactions a member performs with the organization to detect such influences. Since each individual's decisions are dependent on interactions with one or more other people, the interdependency between individuals is reflected in the data. The below method may optionally be used to uncover this interdependency and to measure $f_\pi^I(v)$ and $f_{\pi^{-1}}^I(v)$ with a high degree of accuracy, preferably with regard to implicit communication as described herein. Optionally and preferably, the member of the social group and/or network is a customer or potential customer.

Turning now to the drawing, as shown in FIG. 4, in stage 1, let $E_e^a$, $E_e^p$ denote the active or passive possible distinct event of v influencing u with measured energy e. in most cases while influence is continuous, measurable influence $e \in \{0,1\}$ as e is measured when u interacts with the organization and that is a yes/no event. The influence is determined to be active or passive based on the type of information (tangible/non tangible), is the information not portable and not accessible to u (for example, a vacation is not portable, as it cannot be brought or shown to others later; it is also not accessible unless u participates in the vacation)

$$w_e'^{Ia} = \frac{\sum E_e^a}{\|\{E_e^a\}\|} \times c$$

And similarly to p.

As for FIG. 3, let I denote the information, inclination or content to be transferred within the social network. Let e=(v, u) denote an edge in a graph describing a social network.

Let $f_I$: (R, R, R, . . . )→R denote the correlation function between all possible I's and a specific I. So for example f describes the average influence of an individual based on combined influences for many different types of information etc. The value of f is calculated from the data in stage 2.

In stage 3, the following equation is obtained:
$w_e^{Ia} = f(w_e'^{I_1a}, w_e'^{I_2a}, w_e'^{I_3a}, \ldots)$.
This equation permits quantification of $w_e^{Ip}$, $w_e^{Ia} \in R$ which are the influence factors in stage 4.

Optionally one or more heuristics may be applied to filter or condition the above analyzed data, in order to identify influence. For example, once a social connection has been detected (optionally by filtering as previously described), a filter may be applied to measure the probability that A influences B by taking statistically distinct content transactions. Another filter is determining transactions with a similar content and with a temporal sequence, indicating a greater possibility of influence. Detecting transactions with a similar content may optionally be performed by overlaying other database transactions available from open sources or other verticals or from one or more databases such as identified Internet transactions.

As a non-limiting example of an application of the above method, consider the following. Let G be a directed graph describing the social network of the buyers at a particular retail chain. Let $I_1$ denote shopping at the store.

$I_2$ denote purchasing a particular SKU or SKU group.

$E_e^p$ denotes and event by which person v can influence person u. For example, person v buys a blouse and if person u buys the same blouse within a given time period, such as for example 3 weeks, than e=1, otherwise e=0. Since the blouse is shown (ie is visible to the person potentially being influenced), preferably passive influence is first quantified.

In this example, person v had 60 opportunities to influence u to buy a certain model, out of which person v did effect such influence 5 times. The influence weight is $w_e^{Ip} = 5/60 * c_1$ where C is the constant derived from the dataset.

Similarly, assume that the $w_e^{I_1a} = 0.2 * C_2$

By looking at all people in the dataset, there is a correlation between people that have an influence in the model, and actually inducing an influenced person to shop at the store.

$$f_{I_1}(w'_1, w'_2) = w'_1 + w'_2 * 0.5$$

So, $$w_e^{I_1a} = 5/60 * c_1 + 0.2 * c_2 * 0.5$$

Figure 5:
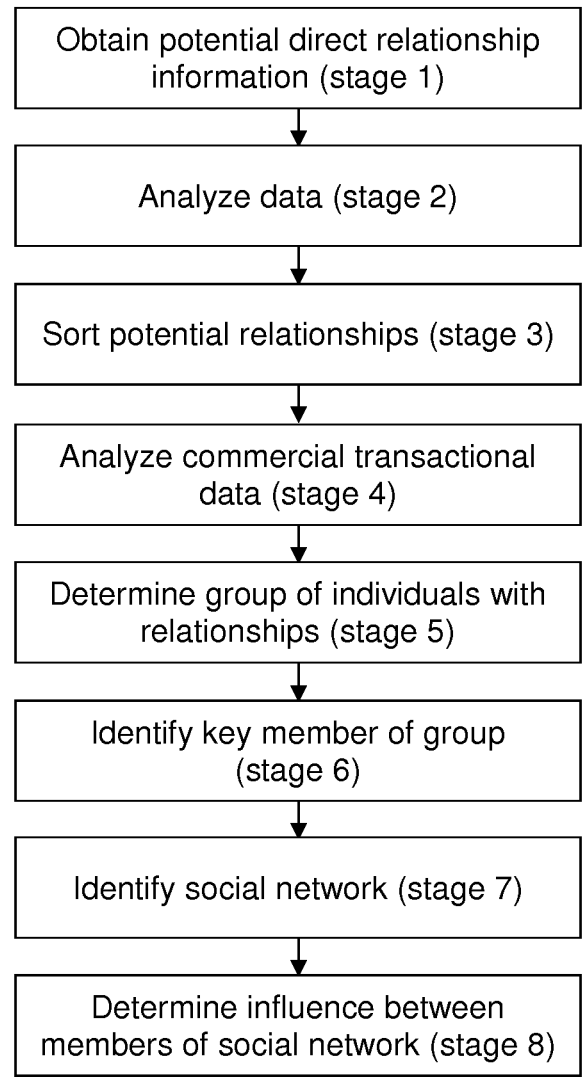
FIG. 5 is a flowchart of an exemplary, illustrative method for iterative clustering according to the present invention.

FIG. 5 is a flowchart of an exemplary, illustrative method for iterative clustering according to the present invention. As shown in stage 1, data regarding potential direct relationship information is obtained. Non-limiting examples include evidence of direct communication (for example by telephone or email); shared background such as schools or universities attended; and any current shared life aspects such as shared address, near neighbors (for example on the same street or within a delimited geographical area), shared workplace, children or spouses which have share educational institute (school) or workplace and so forth.

In stage 2, this data is analyzed, preferably first by weighting the information according to likelihood of a shared relationship, and also optionally by combining relationship data from several sources in order to strengthen the possibility of a relationship. The type of analysis preferably comprises one or more clustering type algorithms, including but not limited to, K-means algorithm, Fuzzy C-means, QT clustering, agglomerative hierarchical clustering and so forth.

Optionally and preferably stages 1 and 2 are repeated for different types of direct relationship information, for example according to complexity thereof. For example, optionally a geographical area is expanded in order to capture additional relationship information, thereby increasing the complexity, such that stages 1 and 2 are first preferably performed for a more limited geographical area, and thereafter repeated (ie more preferably performed iteratively) for more expansive geographical area(s).

In stage 3, optionally the potential relationships are sorted according to likelihood, whether with regard to a cut-off threshold, relative ranking or any other method.

In stage 4, transaction data, which is optionally and preferably commercial transaction data, is analyzed according to the previously determined relationships. If the relationships are sorted, then the most likely relationships are considered first with regard to the (optionally commercial) transaction data in order to determine an influential (optionally commercial) transaction relationship between two or more individuals.

Stage 4 is optionally and preferably performed repeatedly, again more preferably according to increasing complexity of the transaction data being analyzed, such that the analysis is more preferably performed identified.

Furthermore, the analysis produced from stages 1 and 2 is optionally and preferably used to reduce the complexity of the transactional data for the analysis in stage 4, particularly for large data sets (for example transactional data or purchases for a major credit card company).

In stage 5, optionally a group of such individuals is determined. Preferably in stage 6, a key member of the group is identified, who as previously described is more influential than the others on commercial transactions.

In stage 7, optionally and preferably a social network of such individuals is determined (this stage may optionally be performed after stage 5 or in place of stage 5, and may also optionally be performed between stages 3 and 4), followed by determining the influence between such individuals in stage 8 (optionally, if stage 7 is performed between stages 3 and 4, stage 8 may optionally be combined with stage 4).

Marketing Uses of Model Derivatives

This example relates to various illustrative, non-limiting methods for employing the information obtained as described previously, particularly with regard to FIGS. 3 and 4.

Prediction

These quantities can now be used in any econometric predictive model as inputs. This allows any existing statistical model to be far more accurate.

For example: Let I denote the position on resigning a cellular service. For each customer v input the then current $f_{\pi^{-1}(v)}^{I}$ is preferably input into a statistical model in an attempt to predict churn. In other words, in predicting churn, not only the transactional history of the individual is considered, but also actual churn and churn possibilities by the individual's social network members (for example friends and family). Thus, the influences throughout a social network may optionally comprise a "social variable" which is then preferably input to a statistical model in conjunction with other variables.

Measure→Design→Implement→Measure

These quantities can also be used to measure how they are affected by the organization's marketing efforts. For example, if a certain product has $w_e^{Ip}$, $w_e^{Ia}$, at time $t_0$ and the organization wished to increase the word of generated, the organization can measure $w_e^{Ip}$, $w_e^{Ia}$ at time $t_0$ using the methods described herein, design a different marketing approach, implement the new approach and then measure the change in $w_e^{Ip}$, $w_e^{Ia}$ time $t_1$.

Increasing Trends

The above methods may also optionally be used to identify trends and increase or preempt them, optionally and preferably by repeatedly measuring $f_{\pi^{-1}(v)}^{I}$ over time for every v.

Example 1 for Implementation

Retailer

This technology has been implemented successfully in a retailer. The following is a short description of the process:

Retailer Description

A clothing retailer consisted of 100,000 regular customer has been analyzed. Customers make purchases 1-2 times a year on average in this retailer.

Analysis Process

For the purposes of increasing marketing goals, the retailer has defined several information types:

$I_1$—The decision to start purchasing at the retailer.
$I_2$—The decision to cease purchasing at the retailer.
$I_3$—Selecting a specific fashion model or clothing line.
$I_4$—Make a purchase.

The database provided by the merchant was then analyzed by applying algorithms to calibrate the social influence ($f_{\pi(v)}^{I}$ and $f_{\pi^{-1}(v)}^{I}$) with respect to each information type. The social influence(s) for each of the 100,000 customers in the database was then determined.

Uses:

1. Churn Prediction

The purpose of this activity is to rank the customers that are most likely to resign from purchasing at the retailer within the next 6 months from Nov. 1, 2007. The retailer preformed this analysis using classic data mining statistical algorithms, in this case decision trees, clustering and logistical regression. A training set was defined as all customers who were frequent customers on Nov. 1, 2006. The algorithm used the training set variables to try and predict the results of which customer has churned. By the time the algorithm was run, the results have been already known. The input variables contained about 40 different variables including all standard parameters for this analysis such as frequency, monetary, as well as model purchasing, favorite shop in the chain, demographical attributes etc. Moreover changes in behavior (as measured by any change in variables over time) were also input.

These algorithms select variables that are independent of each other (for example, winter purchases were correlated with winter model selection so one of them is enough). Later the algorithms rank variables by their ability to predict accurately.

The most predictive variable was the total influence on a person to make a purchase, or $f_{\pi^{-1}(v)}^{I_4}$. The more a person is influenced to make a purchase by his social environment, the less likely he is to stop shopping. The second most predictive variable was the money a person spent with the retailer. The retailer launched a campaign on November 15$^{th}$ to prevent churn of customer with highest risk of churn.

2. Churned Opinion Leader Identification

The purpose of this activity is to find customers that have stopped shopping and have caused their social environment to stop shopping. For this purpose, $f_{\pi(v)}^{I2}$ was calculated for each v. The values were ranked. A survey of several v confirmed that they indeed caused their friends to stop shopping, in some cases even actively boycotting the retailer (for example due to perceived poor treatment during a sale and/or attempted return of a product or other customer service experience). As a result the CEO of the retailer decided to change several policies, including the item return policy.

3. Win back. The purpose of this is to find customers that have stopped shopping and increase the social influence on them to start shopping again ($f_{\pi^{-1}(v)}^{I1}$). There is a second degree of optimization in this case as individuals with the greatest influence on others who have churned are preferably selected. As a result, the retailer has launched a campaign that targets opinion leaders with large churned neighborhoods (ie social networks of many individuals who themselves churned).

Example 2 for Implementation

Hotel

As described above, according to some embodiments of the present invention, there is provided a method for constructing a marketing application, such as a marketing campaign, by building a social network; determining influence of one or more members on each other through the network; and then constructing the marketing campaign (for example) according to such influences, for example by marketing preferentially and/or differently to a key member of the network.

For this example, the above method is optionally and preferably implemented as follows. For building the network, the following illustrative situation is considered. A hotel chain has transactional information in the database related to booking and check in data. To build the social network, this data is analyzed to determine the likelihood that two individuals, for example, are connected. Non-limiting examples of transactional data parameters which may optionally support such a connection include staying in the same hotel for the same time, having similar check in identifiers, making other purchases and activities together, and/or similar or parallel changes in their respective reservations. These parameters are preferably analyzed to determine statistical distinctiveness.

Once the network has been constructed, preferably the influence of one or more members on each other is determined according to relationships in the social network. Influence is preferably determined according to implicit communication occurring with statistical distinctiveness, including but not limited to detecting or measuring events that occurred with statistical distinctiveness by time or type, as well as determining individuals who actually make the booking, who make the first purchases, who travel more, who spend more nights at the hotel chain and so forth.

Once these influences have been identified, preferably one or more key members of the group (ie more influential members of the group) are targeted in a marketing application or campaign, for example to increase their loyalty through various known techniques and to increase the likelihood of a successful word of mouth campaign through their influence on other member(s) of the group.

Such an implementation is a non-limiting example for a purchase that may optionally have a long decision cycle or a short decision cycle. The short decision cycle may be apparent for example for business travelers, who may need to travel at short notice and so may make rapid decisions on hotels. The long decision cycle may be apparent for example for tourists traveling for a summer vacation, who may make their decision over several months or even a year. Thus, depending upon the type of travel performed by the members of the social network, the period over which influence is considered is preferably adjusted to incorporate a long or short decision cycle, or both.

Example 3 for Implementation

Telecommunication

Another example is provided herein with regard to implementation of the method according to the present invention for marketing for a telecommunication provider, such as a service provider for example.

To build the social network, optionally and preferably transactional data from the service provider's database is used, for example a cellular telephone service provider. The cellular provider's database contains transactions that describe explicit communication, such as telephone calls, SMS or other messages and other types of communication. Optionally explicit communication is used at least partially to construct the social network. However, more preferably other types of information are used as well, including but not limited to static data as described herein, including but not limited to address, age, co-attendance at a particular school, university, army unit and the like; type of purchasing contract and so forth. Other types of implicit information includes individuals communicating within the same cellular cell on a repeated, preferably frequent basis; or communicating within the same isolated cellular cell (having fewer users), for example; and/or other geographical or other implicit information. Implicit data is preferably selected for use in building the social network after determining that is statistically distinct, for example according to any suitable statistical measure.

Once the social network has been constructed, further processing is preferably performed to determine relevance of the relationship. Alternatively, such processing may be performed before or during construction of the social network. An average person will communicate with 150 different individuals a year. The time spent with each person, the time of call and other communication parameters are not sufficient to describe the relationship between individuals. For example, an individual may communicate with a trusted friend once a week for several minutes to set up a meeting, while communicating several times per week over an extended period with a plumber.

To qualify the relationship as meaningful, preferably a plurality of different types of implicit communication is combined with the explicit communication data. Non-limiting examples of such implicit data include detecting individuals who communicate from and/or live and/or work in the same geographical location at the same time, and/or who purchase the same or similar products at the same or similar time, and so forth, to form implicit parameters through clustering of data. The cellular provider also has transactions describing purchases made with the cellular provider such as device or service purchase, which forms data to be analyzed to detect and/or measure implicit communication.

This implementation was tested with transactional data from the database of a cellular telephone service provider. When introducing these implicit parameters more than 90% of the network definition changed drastically.

Next, influence is preferably determined. The constructed social network served as a basis to determine influence. Influence on events (such as device upgrade) that occurred with statistical distinctiveness by time or model type for example was measured as previously described.

The method also enabled measurement of several social phenomena such as churn. It was determined that friends of individuals (subscribers) who churned were influenced such that they were ten times more likely to churn themselves. However, these individuals were only two times more likely to churn due to influence from churning subscribers with whom they had a great deal of communication but by whom they were not influenced.

The method also enabled detection of the opinion leaders (key members) of the social network who in fact drove churn in the social network; typically each caused 3-5 other subscribers to churn.

Next, optionally and preferably a marketing campaign is constructed according to the above information. For this example, the subscribers who are at high risk of churning due to social influence are preferably targeted through one or more marketing efforts to prevent them from churning.

The above method also was used to identify one or more opinion leaders who may optionally also be specifically targeted, for example optionally through application of one or more tools that are intended to make them more involved with the organization and to retain them as loyal customers.

Example 4 for Implementation

Internet Data Analysis

The Internet includes a great deal of explicit communication, such as email messages that are sent from one individual to one or more recipients. Furthermore, the Internet also features explicit social networks. However, this explicit information is frequently much less valuable and informative than implicit information. The latter is more difficult to detect and analyze, and so has not been considered in previous attempts to mine Internet data.

An example of such implicit information occurs when a plurality of individuals post a response to a blog or other Internet forum or site, not directly to each other, but rather on the same subject or post, or at similar times or with similar content, or displaying the same interests, or a combination of the above. Another example occurs for a plurality of users that share a common interest, for example sports such as skiing, running, bicycling, scuba diving and so forth, and who visit the same website. This information is preferably not used to segment the population of such visitors according to interests, but rather to detect the presence of an actual relationship within such data.

The potential connections detected according to such an analysis are preferably incorporated into the previously described iterative clustering method. For example, for visitors to one or more scuba diving sites, optionally and preferably their potential connections are further analyzed according to commercial transactional data (such as purchase data and so forth) as previously described, to detect one or more actual relationships as previously described. The data regarding visitors to one or more scuba diving sites is optionally and preferably used to reduce the complexity of the transactional data, particularly for large data sets (for example transactional data or purchases for a major credit card company). The Internet is a non-limiting example for any type of open source data or commercially purchasable large data collections.

According to other embodiments, most if not all information is determined according to actions, activities and interactions through the Internet. For example, click analysis of visitors to a web site is performed, optionally to determine whether their computer have the same IP address for example, and/or whether a plurality of visitors all enter directly to a web page within the web site (apart from the landing or home page, such as a specific article for example), and not through a search engine, which may optionally indicate a referral. The content of such web sites may also optionally be analyzed, for example to determine a common interest (such as scuba diving), a common geographical area and so forth. The common geographical area may optionally be expanded for Internet based analyses.

Further click analyses may optionally be performed to attempt to determine an implicit connection. For example, a first visitor to an article deep within a web site may optionally reach such an article through a search engine, while a second visitor directly enters to the article without a search engine and without viewing any other page of the web site. The second visitor may therefore optionally have been referred by the first visitor, thereby indicating a potential connection.

Example 5 for Implementation

Other Types of Transactions

The above examples related to commercial transactions, particularly at retail stores. However, the present invention may optionally be applied to a variety of different commercial transactions, including but not limited to one or more of telecoms (including cellular, local telephone service providers and long distance providers); credit card providers; credit unions; retail banking; retail financial services (including but not limited to one or more of insurance and investments); restaurants; travel agencies and/or purveyors; airlines; train, bus and other transportation providers; hotel and resort chains and/or single establishments; health services, country clubs, sports centers, spa and health centers; and supermarkets, pharmacies and other purveyors of consumable goods. A table is provided below, indicating some non-limiting, illustrative examples of influence factors and/or transactional factors which may be analyzed according to the present invention.

|  | Transactions | Location | Content | Gifts |
|---|---|---|---|---|
| Telecoms | Calls with specific frequency, duration, and reciprocity, originating | The correlation between originating cells of two people | Purchase of product or service, interaction with internet content, interaction |  |

-continued

| | Transactions | Location | Content | Gifts |
|---|---|---|---|---|
| Credit Card Providers Credit Unions | Cell, specific time of day, week or year. Purchases made with close time proximity (minutes) in the same store repeatedly | Purchases made with proximity correlation outside the 3 sigma normal location distribution within a close proximity of time (days). | with specific business vertical phone numbers Purchase at similar or same retailers with similar purchase price. | |
| Retail Banking | ATM withdrawals. Money transfer in or out from a employee business or individual. | Withdrawals made with proximity correlation outside the 3 sigma normal location distribution within a close proximity of time (days). | Purchase or registration of financial service or product from the bank. | Money transfers between individuals |
| Various types of retailers | Store Visit, purchased SKU. | Purchases made with proximity correlation outside the 3 sigma normal location distribution within a close proximity of time (days). | SKU purchase. | |
| Travel Agencies, Airlines, Train, bus and other transportation providers. Hotel and Resort chains or individual establishments. | Mutual booking, Similar seating, consecutive or close check in time, | Same destination and travel dates. | Selection of specific travel times and places. | |
| Health Services | Selection of Doctors, Filling prescriptions | | Selection of specific service provides, doctors or medicines. | |

Other non-limiting examples of applications of the present invention include: creating trends; micro segmentation of markets; focusing marketing activities in specific communities (saturating communities, for instance); adding all of the influence metrics as input to statistical modeling; fraud detection; contagious disease spreading analysis and prevention; and crime activity monitoring and prevention.

It should be noted that optionally any method for building a social network as described above may be employed, alone or in combination, to actually construct the social network itself, after which the network may optionally be used in a different application than that described above. For example, a social network constructed for marketing may optionally be used for infectious disease prediction, tracking, prevention and control, and/or crime activity monitoring and prevention, and so forth.

Also optionally a social network built for another purpose, for example an Internet or web-based social network such as Facebook for example, may be used for one or more of the above described methods of determining influence, identifying key members of a group or social network, and so forth.

While the invention has been described with respect to a limited number of embodiments, it will be appreciated that many variations, modifications and other applications of the invention may be made.

What is claimed is:

1. A method for constructing a network of communication flows for a social group comprising a plurality of members, the following method steps being performed by a computer, the method comprising:
   detecting at least one relationship between the plurality of members according to a flow of communication between the plurality of members;
   detecting implicit communication to form detected implicit communication by detecting purchasing the same or similar
products at the same or similar time and also further by detecting one or more of communicating within the same cellular cell on a repeated basis, one or more of communicating from, living in, or working in the same geographical location at the same time, or a combination thereof, wherein said detected implicit communication is further detected by at least one commercial transaction;
   analyzing said detected implicit communication to determine possible transfer of information between each plurality of members having said relationship to determine influence according to a mathematical model of information transfer through implicit communication, wherein said mathematical model determines a weighting of said influence;
   determining active and passive coefficients for active and passive transfer of information, respectively, by analyzing said influence, wherein said active and passive coefficients are determined according to said detected implicit communication and according to said weighting; and
   detecting at least one key member of the network of communication flows according to said active and passive coefficients for transfer of information.

2. The method of claim 1, wherein said at least one commercial transaction relates to purchase of a product.

3. The method of claim 2, wherein said at least one commercial transaction relates to one or more of churn, client acquisition, up-sell, cross-sell or win-back, or a combination thereof.

4. The method of claim 3, wherein said commercial transaction relates to a company and wherein said commercial transaction further comprises contacting said company or changing at least one parameter of said commercial transaction.

5. The method of claim 2, further comprising:
determining at least one marketing action according to the relationship with said key member.

6. The method of claim 5, wherein said at least one marketing action comprises one or more of increasing brand awareness, churn prevention, client retention, client acquisition, up-sell, cross-sell or win-back, or a combination thereof.

7. The method of claim 1, wherein said at least one commercial transaction relates to purchase of a subscription.

8. The method of claim 1, further comprising:
detecting a plurality of key members of the network of communication flows;
determining a number of members influenced by each key member; and
selecting a particular key member as having at least a threshold number of influenced members.

9. The method of claim 8, wherein said threshold comprising having the largest number of influenced members.

10. The method of claim 9, further comprising:
addressing at least one marketing method to said particular key member.

11. The method of claim 1, further comprising detecting explicit communication and also determining the relationship according to said explicit communication.

12. The method of claim 1, further comprising:
determining a plurality of relationships of the network of communication flows;
constructing the network of communication flows from said plurality of relationships;
repeating to construct a plurality of networks of communication flows; and
overlaying said plurality of networks of communication flows to combine into a combined network of communication flows according to a similarity threshold.

13. The method of claim 1, further comprising:
determining a strength of said relationship; and
selecting a preferred mode of influence from active or passive according to said strength of said relationship.

14. The method of claim 1, wherein said implicit communication is performed through the Internet.

15. The method of claim 14, wherein said implicit communication through the Internet includes one or more of e-mail, posting on a web page, posting on a blog, posting on a chat room, visiting a web page or an IM (instant messenger) message.

16. The method of claim 14, further comprising analyzing said implicit communication according to content to detect a potential relationship.

17. The method of claim 1, wherein said implicit communication is detected according to proximity in both time and location to said at least one transactional event.

* * * * *